Feb. 12, 1929.
H. GOLDBERG
1,702,078
LABORATORY HEATER
Filed Aug. 8, 1925
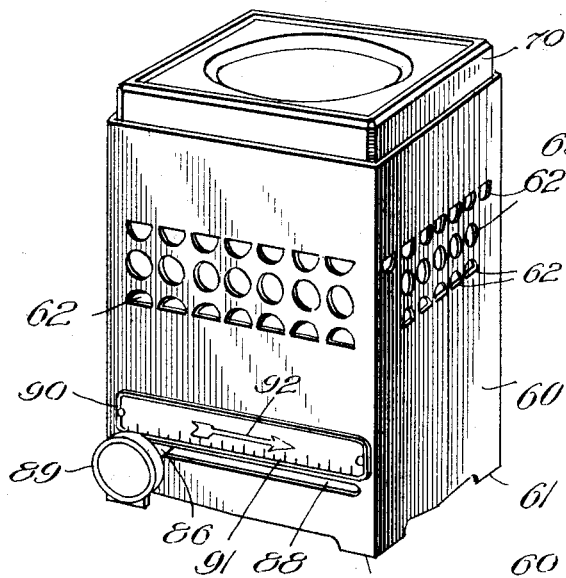
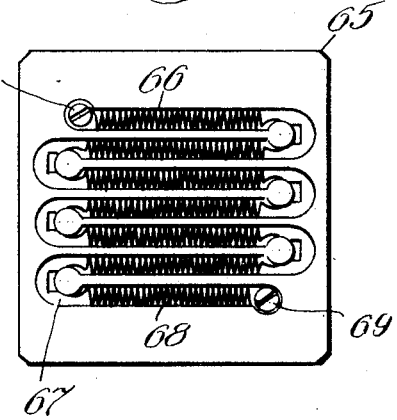
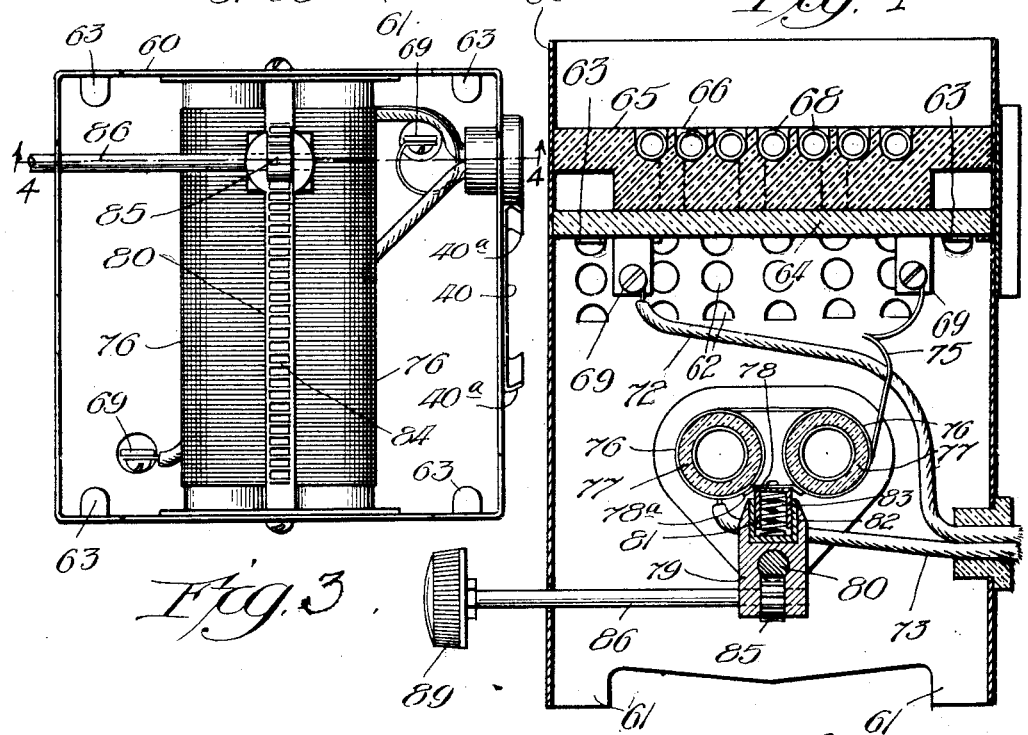
Inventor;
Herman Goldberg,
by Rector, Hibben, Davis & Macauley,
Attys Patented Feb. 12, 1929.

1,702,078

UNITED STATES PATENT OFFICE.

HERMAN GOLDBERG, OF CHICAGO, ILLINOIS, ASSIGNOR TO PRECISION SCIENTIFIC CO., OF CHICAGO, ILLINOIS, A CORPORATION OF ILLINOIS.

LABORATORY HEATER.

Application filed August 8, 1925. Serial No. 48,970.

This invention relates to improvements in laboratory heaters and its purpose is to provide an improved device adapted particularly for use in chemical laboratories and the like for applying heat to the various vessels and appliances which are employed in chemical operations and experiments. The principal object of the invention is to provide an improved electrical heater for laboratory use. Another object is to provide a simplified form of heater comprising a minimum number of parts which may be constructed at small cost and conveniently assembled. A further object is to provide an improved electrically operated heater comprising improved means for controlling the degree of heat. Other objects relate to various features of construction and arrangement which will appear more fully hereinafter.

The nature of the invention will be understood from the following specification taken with the accompanying drawings in which, Fig. 1 is a perspective view of a modified form of heater having embodied therein means for regulating the temperature produced; Fig. 2 shows a top plan view of the electric heating element and its insulating support embodied in the heater of Fig. 1; Fig. 3 shows a bottom plan view of the heater illustrated in Fig. 1; and Fig. 4 shows a vertical section taken on the line 4—4 of Fig. 3.

In Figs. 1, 2, 3 and 4 of the drawings, there is illustrated one modification of the invention comprising means for regulating the heat produced by the electrical heating elements. In this form, there is provided a rectangular housing 60 of sheet-metal or the like provided at its corners with relatively short legs 61 adapted to rest upon a suitable support and provided also in its lateral walls with holes 62 for the purpose of furnishing ventilation in that portion of the device beneath the heating element. In forming the ventilating apertures 62, a number of inwardly extending ears 63 are formed and these are adapted to support a heat insulating plate 64 which rests directly thereon and which prevents the downward passage of heat produced by the heating plate 65 mounted thereon. The heating plate 65 comprises a plate of baked clay, porcelain or the like having a plurality of grooves 66 which are connected at their alternate ends to form a zigzag recess 67 in which there is mounted the heating element 68 having its ends connected to the terminals 69 which are secured to the underside of the plate 65. The terminals 69 of the electrical heating element are connected to conductors leading from a suitable source of electrical energy and the heat produced by the electrical heating element 68 is transferred upwardly to the top plate 70 which may have any desired form, being illustrated in Fig. 2 as a rectangular plate having an annular rib 70$^a$ around its outer edge and provided centrally with a circular opening 70$^b$ around which there is an inclined wall 70$^c$ for engagement with the lower end of a flask or other vessel employed in chemical work or the like. This top plate 70 extends downwardly within the housing 60 and rests directly on the top surface of the heating plate 65.

In the form of the invention illustrated in Figs. 1, 2, 3 and 4, the terminals 69 of the heating element are connected to a device for regulating the heat. For this purpose, one terminal 69 is connected by a conductor 72 to one terminal of the source of electrical energy and the conductor 73 leading from the other terminal of that source is connected to one end of a conductor 75 which serves as a resistance to regulate the heat produced. The resistance wire 75 is wound in two helical coils 76 which are located on insulating tubes 77 extending between the opposite walls of the housing 60 and the end of the resistance wire 75 opposite the supply conductor 73 is connected to the other terminal 69 of the heating element 68. The connections of the resistance wire 75 to the conductor 73 and to the heating element 68 are made at the same ends of the supporting tubes 77 and the length of the resistance wire 75 which is included in the circuit is determined by the position of a short-circuiting contact plate 78 carried by a block 79 which is slidably mounted on a rod 80 extending between the side walls of the housing 60 to which it is secured. The contact plate 78 has downwardly turned extremities 78$^a$ which are adapted to contact with the peripheral surfaces of the helical coils 76 and the contact plate is secured at its central part to an inverted cup-shaped member 81 which is mounted for vertical movement in a guiding member 82 formed of insulating material and embedded in the block 79. A coil spring 83 is mounted within the cup-shaped member 81 and engages the lower wall of the member 82, thus maintaining the contact plate 78 in close contact with the coils 76 of the resistance element 75. The rod 80 has rack teeth 84 formed on its under side to mesh with a pinion 85 which is fixed on a shaft 86 journaled in the block 79 and extending outwardly through a slot 88 formed in the front wall of the housing 60. The outer end of the shaft 86 is provided with a handle 89 and an indicating plate 90 is secured to the housing 60 above the slot 88 for the purpose of indicating the temperature produced with the contact plate 78 in different positions. It will be apparent that upon rotation of the shaft 86, the block 79 is adjusted longitudinally by the engagement of the pinion 85 with the rack teeth 84, thus regulating the portion of the resistance coils which are in the circuit and thereby producing different temperatures in the heating element 68. The different positions of the block 79 and the contact plate 78 and the temperatures corresponding thereto are indicated by graduations 91 on the plate 90 and this plate also carries an indicating arrow 92 which indicates the direction of movement for increasing the temperature. By this simple device which is embodied in the heating device as a part of the permanent assembly, it is possible to produce any desired temperature within a considerable range and to secure the same degree of temperature for several successive experiments or chemical operations, since the handle 89 may be adjusted to position the shaft 86 beneath the same graduation 91 on the indicating plate 90.

Although a certain form of the invention has been shown and described by way of illustration, it will be understood that the invention may be embodied in various other forms within the scope of the appended claim.

I claim:

A heating device comprising a sheet metal casing having a plurality of ventilating openings punched in the wall thereof and forming a plurality of inwardly projecting tongues, a heat insulating partition resting on said tongues, a heating plate resting on the top surface of said partition, a heating element carried by said heating plate, a top plate resting on said heating plate having means for supporting a vessel, an electric circuit for said heating element, a rheostat located in the lower part of said casing and beneath said partition and connected in said circuit, and means operable from the outside of said casing for regulating said rheostat.

HERMAN GOLDBERG.